United States Patent
Kim et al.

(10) Patent No.: US 6,766,103 B2
(45) Date of Patent: Jul. 20, 2004

(54) METHOD FOR RECORDING AND REPRODUCING REPRESENTATIVE AUDIO DATA TO/FROM A REWRITABLE RECORDING MEDIUM

(75) Inventors: Hyung-Sun Kim, Seoul (KR); Kang-Soo Seo, Kyunggi-do (KR); Byung-Jin Kim, Kyunggi-do (KR); Jea-Yong Yoo, Seoul (KR); Soung-Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 09/783,987

(22) Filed: Feb. 16, 2001

(65) Prior Publication Data

US 2001/0030911 A1 Oct. 18, 2001

(30) Foreign Application Priority Data

| Feb. 19, 2000 | (KR) | ................................. | 2000-08060 |
| Mar. 9, 2000 | (KR) | ................................. | 2000-11885 |
| May 31, 2000 | (KR) | ................................. | 2000-29789 |
| May 29, 2000 | (KR) | ................................. | 2000-29100 |

(51) Int. Cl.[7] .......................................... H04N 5/928
(52) U.S. Cl. .................. 386/96; 386/105; 386/126; 369/32.08
(58) Field of Search ................. 369/32.08, 32.04; 386/98, 96

(56) References Cited

U.S. PATENT DOCUMENTS

| 5,367,410 A | * | 11/1994 | McCarthy | .................... 360/48 |
| 5,640,375 A | * | 6/1997 | Barrett | ........................ 369/30 |
| 5,666,336 A | * | 9/1997 | Yoshida | .................... 369/30.11 |
| 5,805,537 A | * | 9/1998 | Yamamoto et al. | ......... 369/4 X |
| 5,824,933 A | * | 10/1998 | Gabriel | ........................ 84/609 |
| 5,902,115 A | * | 5/1999 | Katayama | ............... 434/307 A |
| 5,913,010 A | * | 6/1999 | Kaneshige et al. | ........... 386/70 |
| 5,999,505 A | * | 12/1999 | Yasui | .................. 369/53.31 X |
| 6,009,234 A | * | 12/1999 | Taira et al. | .................... 386/95 |
| 6,081,651 A | * | 6/2000 | Kim | ........................... 386/111 |
| 6,091,674 A | * | 7/2000 | Tozaki et al. | ............. 369/38.08 |
| 6,225,546 B1 | * | 5/2001 | Kraft et al. | .................... 84/609 |
| 6,283,764 B2 | * | 9/2001 | Kajiyama et al. | ........... 434/307 |
| 6,308,006 B1 | * | 10/2001 | Yamamoto et al. | ........... 386/96 |
| 6,442,517 B1 | * | 8/2002 | Miller et al. | ................. 704/201 |

FOREIGN PATENT DOCUMENTS

| EP | 0 910 082 A2 | 4/1999 |
| EP | 1 041 566 A1 | 10/2000 |
| EP | 1 096 489 A1 | 5/2001 |
| EP | 1 102 270 A1 | 5/2001 |
| JP | 2000-165789 | * 6/2000 ........... H04N/5/781 |

OTHER PUBLICATIONS

Machine translation of JP 2000–165789.*

* cited by examiner

Primary Examiner—Aristotelis M. Psitos
(74) Attorney, Agent, or Firm—Birch, Stewart, Kolasch & Birch, LLP

(57) ABSTRACT

The present invention writes location information on representative audio sections, each being specified within an audio track by a user, for audio tracks recorded in a high-capacity storage medium, and, if requested, reproduces representative audio sections only using the written location information, thereby helping a user find a desirable audio track easily and quickly among a lot of recorded audio tracks.

27 Claims, 7 Drawing Sheets

Conventional Art

*Conventional Art*

METHOD FOR RECORDING AND REPRODUCING REPRESENTATIVE AUDIO DATA TO/FROM A REWRITABLE RECORDING MEDIUM

BACKGROUND OF THE INVENTION

1. Field of the Invention

The present invention relates to a method for managing information on representative audio for audio tracks recorded in a rewritable recording medium and for reproducing the representative audio to have a user know easily what contents a recorded audio track has.

2. Description of the Related Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, that is, high-quality moving picture or audio data is recorded in a DVD for much longer time. Therefore, a DVD will be used widely in the near future.

There are three types in a DVD, DVD-ROM for read-only, DVD-R for write-once, and DVD-RAM or DVD-RW for rewritable. For a rewritable DVD, the standardization of data writing format is in progress.

FIG. 1 is a block diagram of a general optical disk device recording and reproducing video or audio data to/form a rewritable disk.

The disk device configured as FIG. 1 comprises an optical pickup 2 reading a signal recorded in a rewritable DVD 1 or writing a data stream processed into a writable signal in the rewritable DVD 1; a reproduced signal processor 8 restoring the read signal into compressed digital data; a decoder 9 decoding the compressed digital data into original data; a sampler 5 digitizing an inputted analog signal at a predetermined sampling rate; an encoder 4 encoding the digitized data into MPEG-, LPCM-, or AC3- formatted data; a writing signal processor 3 converting data from the encoder 4 into signals adequate to be written; a controller 6 controlling all elements to conduct recording or reproducing operation; and a memory 7 for storing data temporally.

If an analog signal is applied to the disk device of FIG. 1, the sampler 5 samples the analog signal at the predetermined sampling rate, and applies the sampled digital data to the encoder 5. The encoder 5 encodes a block of sampled data into compressed or non-compressed data of pre-specified format, for example, MPEG format for compressed or LPCM format for non-compressed, and the writing signal processor 3 converts bit trains of the formatted data into writing pulses which is applied to the pickup 2. Then, the pickup 2 writes bit information associated with the writing pulses on the recording surface of the rewritable DVD 1.

The audio data recorded continuously from recording start to stop is called a 'track' which is a logical unit and is different from a physical spiral track formed in a rewritable disk. If recording operation stops after a single audio song provided from a microphone or broadcast signal has been recorded, the recorded song corresponds to a track. However, a track may contain several recorded songs if several songs are recorded at a time.

The recorded audio songs, that is, all tracks are indexed by a track set information as shown in FIG. 2. Information for a track recorded newly is inserted in the track set information and information for an erased track is deleted from the track set information.

A part of a track (PoT) only specified within an audio track is able to be reproduced. Such a partial reproduction is initiated through selecting a play list which is used for defining audio track playback sequence.

After a track has been recorded or edited, cell information (CI) is created to refer to full or part of a track. The created cell information is written in an original or a user-defined program chain information (PGCI). A play list is associated with a PGCI through the number of PGCI.

Therefore, if a play list defined by a user or created automatically after recording is selected, the controller 6 searches for a PGCI the selected play list refers to, and reads out location information of full or part of each track written in CIs belonging to the discovered PGCI. Finally, the controller 6 moves the pickup 2 to all locations sequentially, and conducts reproduction operation.

However, a rewritable DVD is much high-capacity storage device, so that many audio tracks can be recorded in it. Therefore, it is very difficult to find a track containing a desirable song or sound after a lot of audio tracks have been recorded.

SUMMARY OF THE INVENTION

It is an object of the present invention to provide a method for managing information on representative audio for audio tracks recorded in a high-capacity storage medium and for reproducing the representative audio to help a user find a desirable audio track easily.

A method of managing information on audio tracks recorded in a rewritable recording medium according to the present invention, receives a command specifying a representative audio section for a full or a partial audio track recorded in the rewritable recording medium, and writes location information on the specified representative audio section in cell information related with the full or the partial audio track.

A method of reproducing audio data recorded in a rewritable recording medium according to the present invention, receives a command requesting representative audio reproduction for audio tracks recorded in the rewritable recording medium, reads location information written in cell information related with full or partial tracks, and searches for and reproduces a data block specified by the read location information after checking whether the read location information is about a representative audio section.

BRIEF DESCRIPTION OF THE DRAWINGS

The accompanying drawings, which are included to provide a further understanding of the invention, illustrate the preferred embodiments of this invention, and together with the description, serve to explain the principles of the present invention.

In the drawings:

FIG. 5 shows another example where representative audio sections are specified for recorded audio tracks according to the present invention.

DESCRIPTION OF THE PREFERRED EMBODIMENT

In order that the invention may be fully understood, preferred embodiments thereof will now be described with reference to the accompanying drawings.

Figure 3:
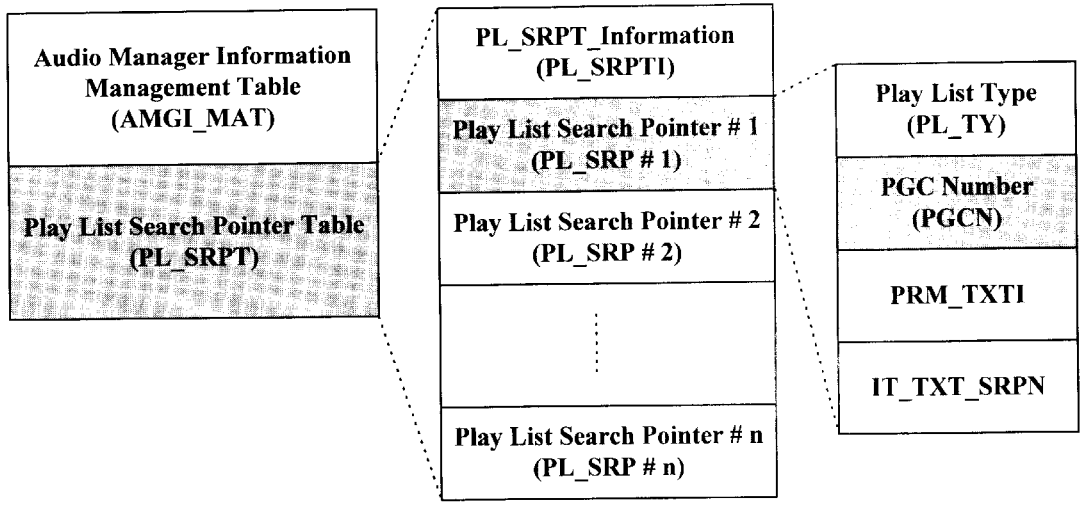
FIG. 3 shows a hierarchical structure of real time recording audio manager information for audio tracks recorded in a rewritable disk.

FIG. 3 shows a hierarchical structure of real time recording audio manager information (RTR_AMGI) for audio tracks recorded in a rewritable disk such as a rewritable DVD.

The RTR_AMGI contains an audio manager information management table 'AMGI_MAT' and a play list search pointer table 'PL_SRPT'. The play list search pointer table consists of play list search pointer table information 'PL_SRPTI' and one or more play list search pointers 'PL_SRP #n'.

Figure 4:
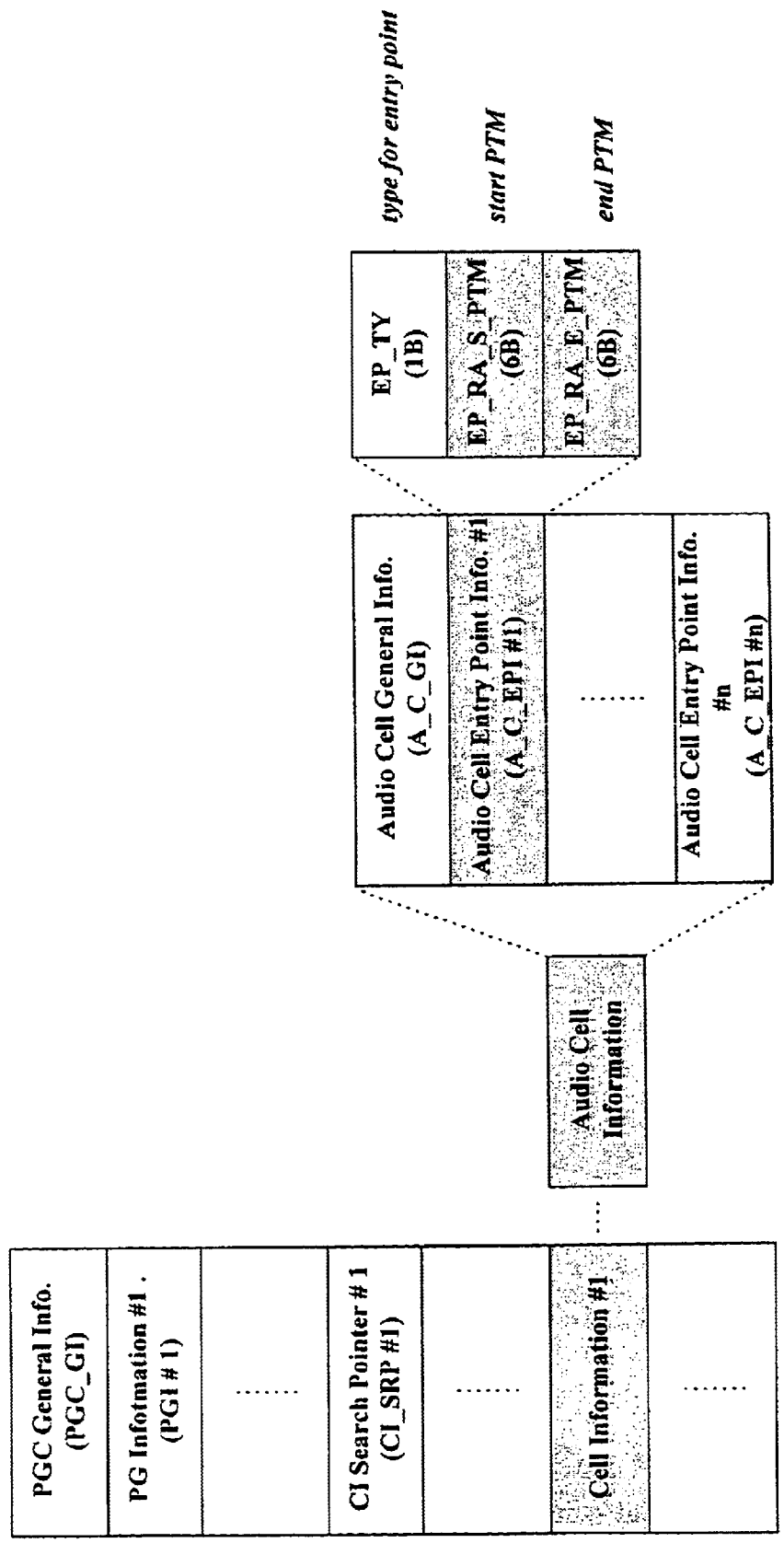
FIG. 4 shows a structured program chain including cell information in which information on a representative audio section is written.

Each play list search pointer has the number of an associated program chain (PGC) which refers to one program chain structured as FIG. 4.

After an audio signal has been recorded in a rewritable DVD through the writing signal processor 3, the controller 6 creates CI related with the recorded track. The created CI has start and end position information of the recorded track in the field of audio cell general information 'A_C_GI', and it is written in a user-defined PGC or an original PGC, which is created automatically after recording, according to user's choice. After several audio tracks have been recorded, several associated CIs are created and then written in a PGC together with location information about each CI as shown in FIG. 4.

And, CI contains a plurality of cell entry point information 'A_C_EPI #n' besides the audio cell general information 'A_C_GI'.

The cell entry point information can contain different information according to its type defined in a type field 'EP_TY'. The location information on representative audio section according to the present invention is written in this cell entry point information with bit value '0001XXXX' ('X' means 'don't-care') in the type field 'EP_TY'. The cell entry point information with bit value '0001XXXX' in the type field contains start and end position information of representative audio section in the fields 'EP_RA_S_PTM' and 'EP_RA_E_PTM', respectively. The position information is expressed in the unit of presentation time (PTM).

If the type field of a cell entry point information has a value of '0110XXXX', it means that the cell entry point information has single position information only indicating a random accessible point.

In the case that a lot of audio tracks have been recorded in the rewritable DVD 1, if a user specifies some representative audio sections for all or some audio tracks in an edit mode, the controller 6 obtains location information for the specified representative audio sections, and writes the obtained location information in respective cell entry information fields of cell information corresponding to audio tracks whose representative audio sections are specified.

A representative audio data may be newly generated from a user's voice, specific sound, and so on, and then recorded instead of being specified within a recorded audio track.

Figure 5:
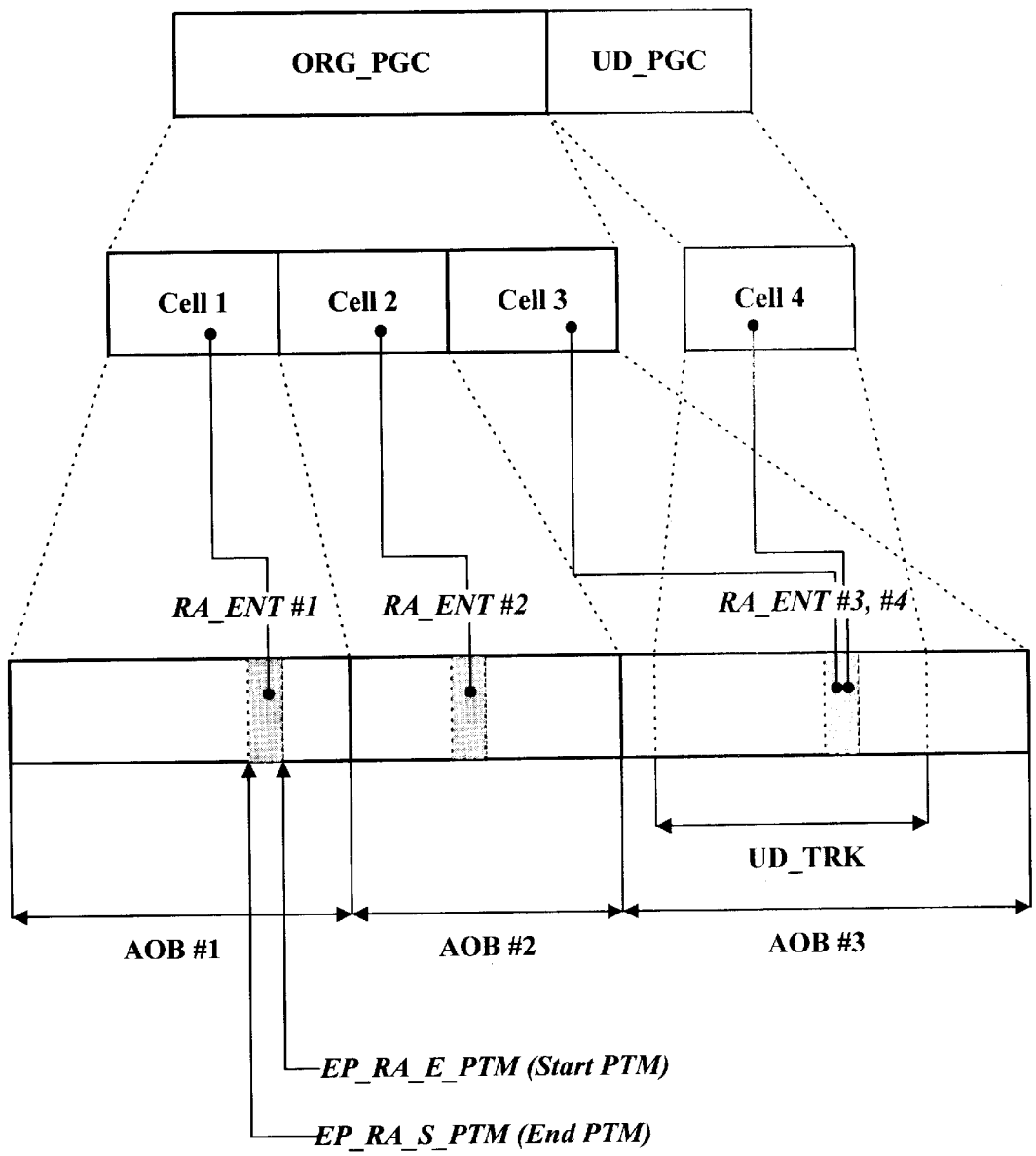
FIG. 5 shows an example where representative audio sections are specified for recorded audio tracks according to the present invention.

FIG. 5 shows an example where representative audio sections are specified for recorded audio tracks according to the present invention. In the example of FIG. 5, the cell entry point defined in FIG. 4 is used to specify start and end position of each representative audio section 'RA_ENT #n', and an audio track is marked as an audio object 'AOB #n' in the drawing.

Explaining the example of FIG. 5, three audio tracks, that is, three audio objects (AOBs) have been recorded, and three CIs associated with three audio tracks have been written in and associated with an original program chain 'ORG_PGC' which has been created after initial record. The controller 6 has created CI 'Cell 4' referring to a partial track 'UD_TRK' specified within the third track 'AOB #3' and has written the created CI 'Cell 4' in a user-defined program chain 'UD_PGC' since the partial track 'UD_TRK' is chosen in edit mode by a user.

The created CI 'Cell 4' also contains start and end position of a specified representative audio section 'RA_ENT #4' for the user-defined partial track 'UD_TRK'. In the example of FIG. 4, the third full track 'AOB #3' and the user-defined partial track 'UD_TRK' have same representative audio section marked as 'RA_ENT #3', 'RA_ENT #4', however, the representative audio section of the user-defined partial track may be specified differently from that of the full track the partial track belongs to.

Figure 6:
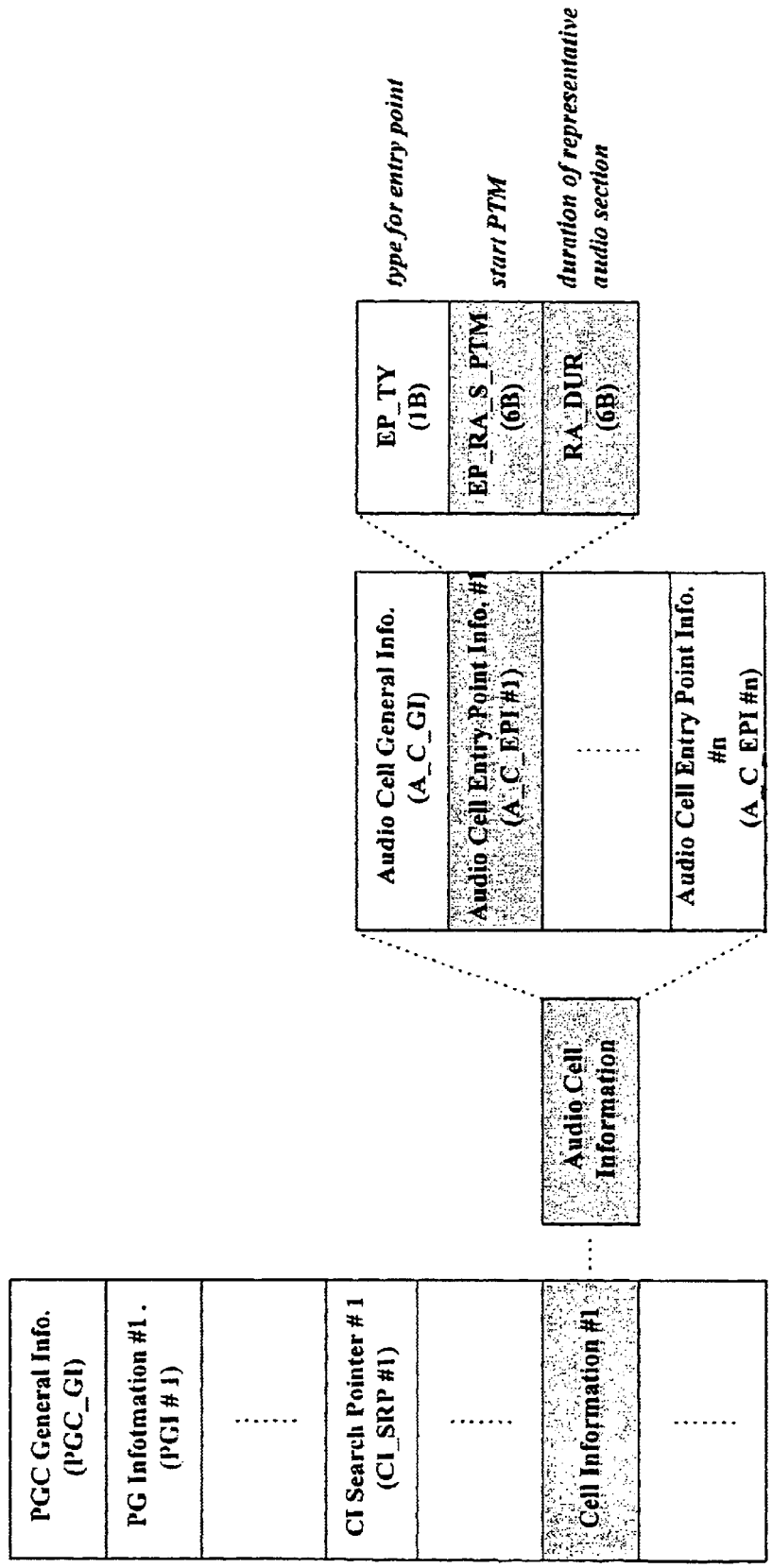
FIG. 6 shows a structured program chain including cell information in which information on a representative audio section is written in different format from FIG. 4.

Instead of using start and end position as location information of a representative audio section as depicted in FIG. 4, it is also possible to use start position and duration to specify a representative audio section. FIG. 6 shows a structured program chain including a cell entry point having fields of entry type, start position, and duration. The number of audio frames included in a specified representative audio section may be written in the duration field instead of time length.

Figure 7:
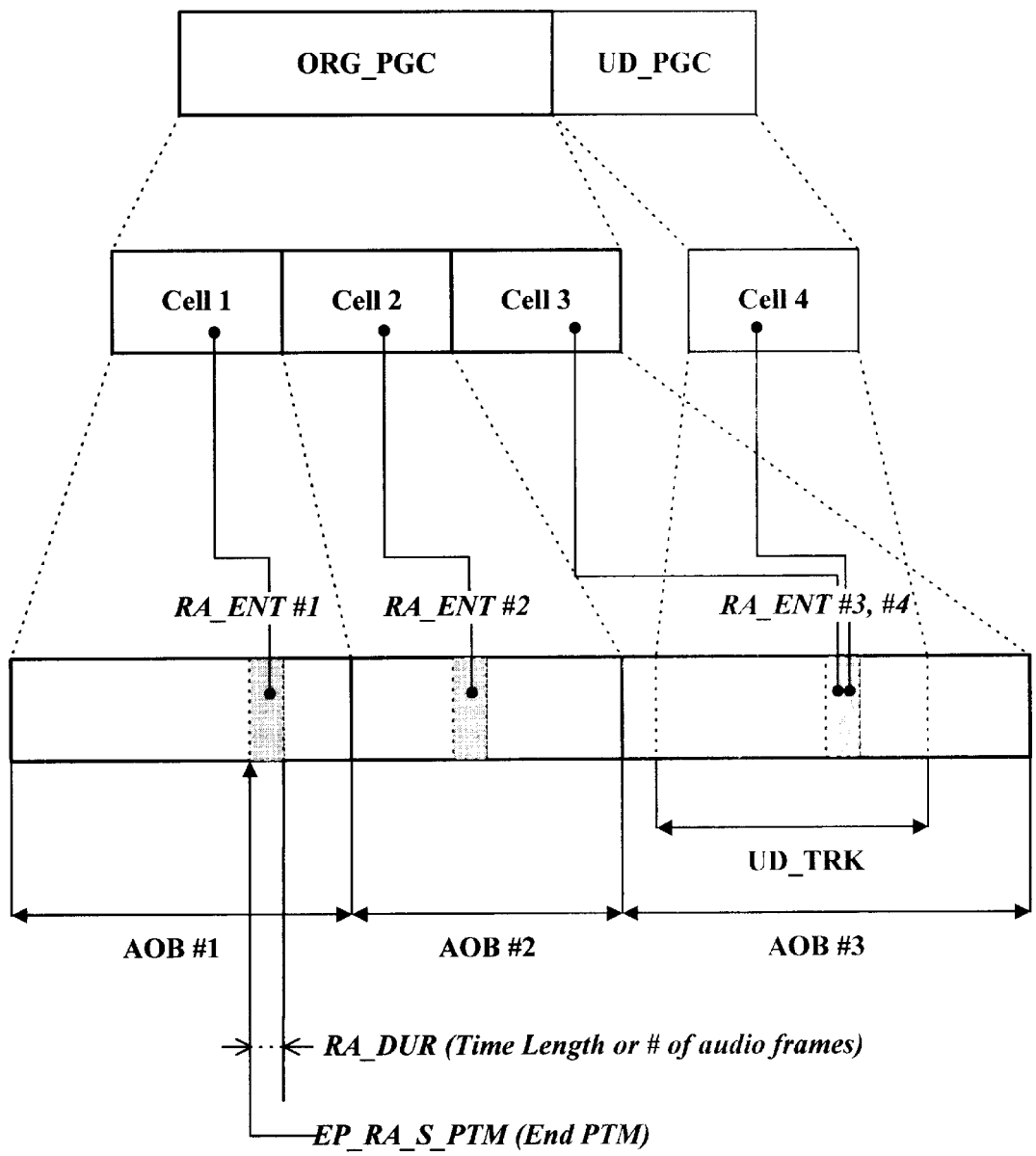

FIG. 7 shows an example where representative audio sections are specified differently from the example of FIG. 5. The example of FIG. 7 shows that CI indicates the length of a representative audio section with the duration information 'RA_DUR' instead of end position information 'EP_RA_E_PTM' which is a field of a cell entry point given in FIG. 4.

Hereinafter, described is a method of reproducing representative audio sections related with recorded audio tracks.

Figure 1:
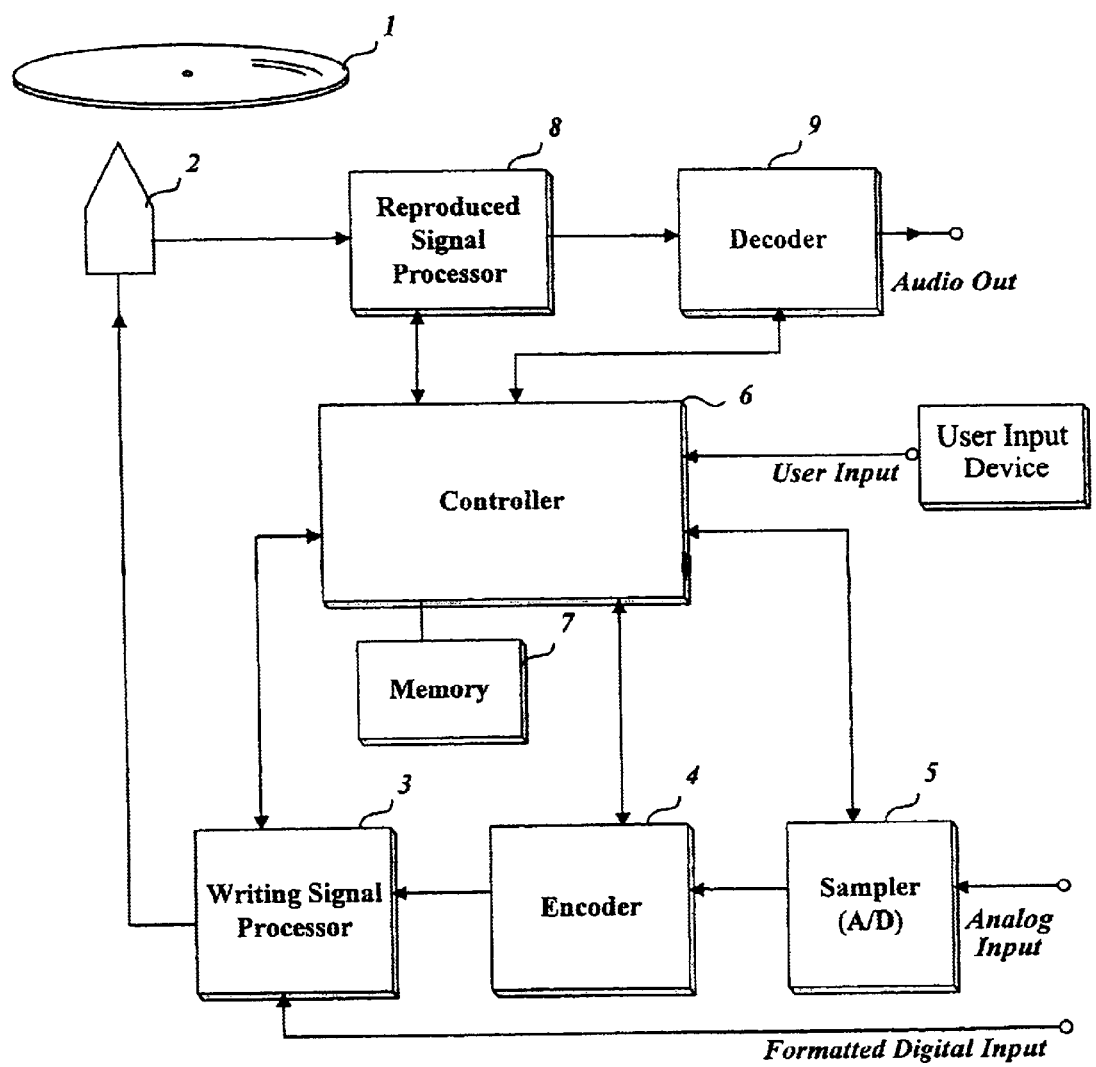
FIG. 1 is a block diagram of a general optical disk device recording and reproducing video or audio data to/form a rewritable disk.
Figure 2:
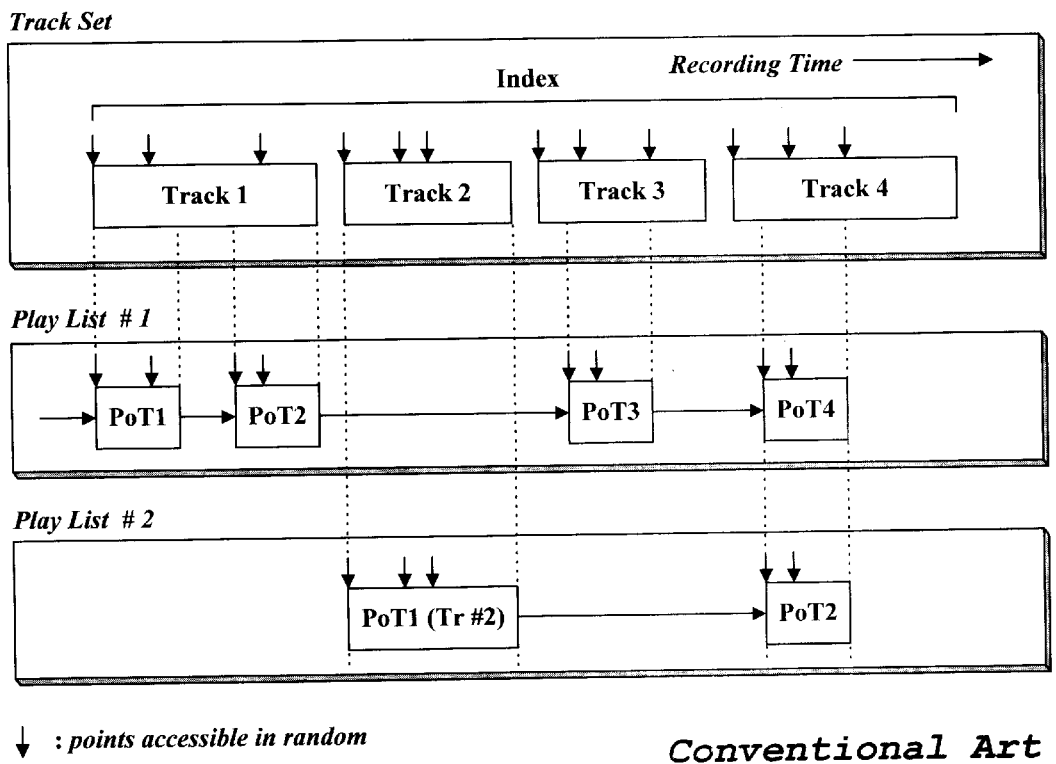
FIG. 2 shows a structure of audio tracks and related play information written in a rewritable disk.
Figure 8:
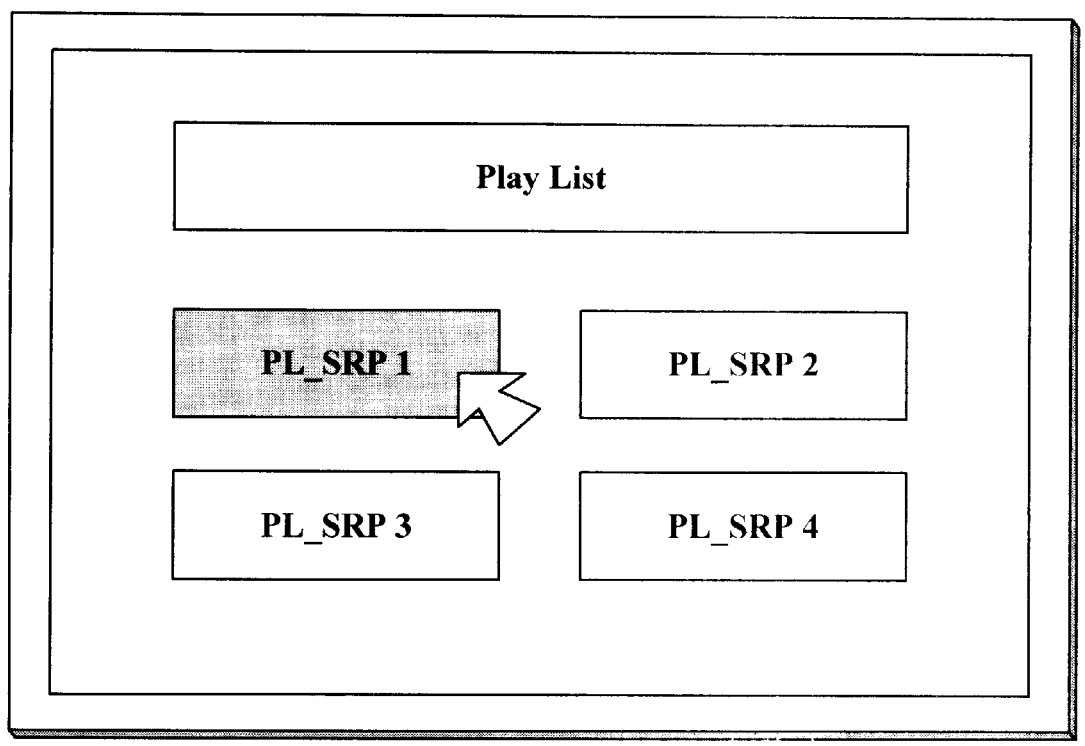
FIG. 8 is an example of screen data displaying several play lists, each being linked with recorded audio tracks.

When a rewritable DVD 1 is inserted into the disk device of FIG. 1, the controller 6 reads out management information for all audio tracks recorded in the rewritable DVD 1 and stores them in the memory 7. If a user requests reproduction of the inserted disk, the controller 6 constructs screen data for selecting a play list based on the real time recording audio manager information (RTR_AMGI) stored in the memory 7, and outputs the constructed screen data to be displayed onto a connected displaying device such as a digital television or an equipped LCD as shown in FIG. 8. At the same time, the controller 6 builds a cursor data and overlaps it with the screen data.

While interpreting movement data of the cursor received from an input device such as a remote controller, the controller 6 moves the cursor position until selection of a play list is done. If a play list among presented play lists is chosen, the controller 6 accesses program chain information indicated by a PGC number written in the selected play list, and reads all CIs written in the accessed program chain information.

For example, the controller 6 reads three CIs associated with the three tracks 'AOB #1', 'AOB #2', and 'AOB #3' if the selected play list is related with an original program chain shown in FIG. 5 or 7. After reading all CIs, the controller 6 checks whether or not each CI includes location information on a representative audio section, and reads the location information consisting of start and end position or start position and its length. For the recording example of FIG. 5 or 7, the location information about the three representative audio sections 'RA_ENT #1, #2, and #3' is read out.

Referring to the read location information of representative audio sections, the controller 6 moves the pickup 2 to the representative audio sections sequentially. At each representative audio section, audio data written within each section is detected by the pickup 2, and is processed into audible sound through the decoder 9 and the reproduced signal processor 8 until the reproduction point arrives at the end position indicated by each cell entry point. This representative audio reproducing operation is conducted up to the audio section indicated by the last CI.

If a user selects a play list related with a user-defined program chain in the above selecting step, the representative audio section 'RA_ENT #4' indicated by the CI 'Cell 4' will be searched and reproduced in the recorded example of FIGS. 5 and 7.

In the above-explained reproduction operation, it is considered that there is no representative audio for an audio track if the type value of a cell entry point written in CI related with the track is not '0001XXXX', thus that track is skipped without reproducing any audio data.

In the recorded example of FIG. 5 or 7, a user-defined program chain has a single partial audio track. However, a user-defined program chain can refer to many partial audio tracks by including a plurality of CIs which have respective location information to access each partial track. For a user-defined program chain referring to a plurality of partial tracks, the controller 6 reproduces representative audio sections specified in CIs sequentially as explained above for the case of an original PGC.

While sequential reproduction of representative audio sections is conducted, the previous or the next representative audio section may be requested to be reproduced from a user through an input device such as a remote controller. If such a request is entered, the controller 6 checks the information written in the previous or the next CI, moves the pickup 2 to the start position pointed by a cell entry point of the previous or the next CI, and reproduces representative audio data within the track section defined by the cell entry point.

In addition, if a track number is entered from a user, the controller 6 searches a program chain being reproduced for CI whose index number is equal to the entered track number, and reproduces representative audio section indicated by a cell entry point of the discovered CI.

It is also possible to replay from a head of a representative audio section being reproduced if 'replay' is commanded. This function is provided so that a representative audio section of a full or partial track is reproduced repeatedly as far as a user wants.

Various aforementioned methods of representative audio reproduction may be commanded through a remote controller as explained above. It is preferable to equip a remote controller with a hot button for 'Representative Audio'. When this hot button is pressed once, which means 'ON' of representative audio reproduction, the above-explained sequential representative audio reproduction is conducted. If there is a specific program chain having been selected prior to press of the hot button, the sequential representative audio reproduction is conducted for audio tracks belonging to the selected program chain. If there is not, the representative audio reproduction is conducted for an original program chain referring to a lately-recorded audio track.

If the hot button for 'Representative Audio' is pressed again, which means 'OFF', the sequential representative audio reproduction being conducted is terminated, and then normal audio track reproduction begins from a head of an audio track including the terminated representative audio section. Therefore, if a user notices that a representative audio being playbacked at present is related with a desirable audio track, he or she presses the hot button for 'Representative Audio' again, then the desirable audio track is playbacked.

The above-explained representative audio reproducing method for recorded audio tracks enables a user to find a desirable audio track easily and quickly among a lot of audio tracks recorded in a high-capacity recording medium such as a rewritable DVD.

The foregoing is provided only for the purpose of illustration and explanation of the preferred embodiments of the present invention, so changes, variations and modifications may be made without departing from the spirit and scope of the invention.

What is claimed is:

1. A method of managing information on audio data recorded in a rewritable recording medium, comprising the steps of:

(a) receiving a command specifying a representative audio section for a full or a partial audio track recorded in the rewritable recording medium, the representative audio section identifying a representative audio characteristic of the audio track and being reproducible during a representative audio reproduction operation; and (b) writing location information on the specified representative audio section into cell information related with the audio track, wherein the location information includes start position information and length information of the specified representative audio section, the start position information and the length information being expressed in presentation time.

2. The method set forth in claim 1, wherein the cell information has a type data indicating that the location information on the specified representative audio section is written.

3. The method set forth in claim 2, wherein the type data is used for distinguishing whether location information written therewith is for a representative audio section or for a random accessible position.

4. The method set forth in claim 1, wherein the representative audio reproduction operation is triggered once a play list is selected and a representative audio switch is turned on.

5. A method of reproducing audio data recorded in a rewritable recording medium, comprising the steps of:

(a) receiving a command requesting a representative audio reproduction operation for audio tracks recorded in the rewritable recording medium;

(b) reading location information written in cell information related with the audio tracks responsive to the command; and (c) searching for and reproducing a data block specified by the read location information during the representative audio reproduction operation, after checking that the read location information pertains to location information of a representative audio section identifying a representative audio characteristic of an audio track, and repeating the searching and reproducing in said step (c) sequentially up to last cell information, wherein the location information includes start information and duration information stored in the cell information, the start information identifying a start position of the representative audio section on the recording medium, the duration information identifying a duration of the representative audio section.

6. The method set forth in claims 5, wherein said step (c) checks a type data indicating whether or not the location information written in the cell information is about a representative audio section, and uses the location information to search for a representative audio section if the type data is indicative of location information of a representative audio section.

7. The method set forth in claim 5, wherein said step (c) checks a type data indicating whether or not the location information written in the cell information is about a representative audio section, and skips a position specified by the location information if the type data is not indicative of location information of a representative audio section.

8. The method set forth in claim 5, wherein said step (c) searches for and reproduces a previous or a next representative audio section specified by cell information previous or next to the present cell of which representative audio section is being reproduced, if a jump command to the previous or the next representative audio section is entered while conducting the sequential representative audio reproduction operation.

9. The method set forth in claim 5, wherein, if a track number is designated while conducting the sequential representative audio reproduction operation, said step (c) searches for and reproduces a representative audio section specified by cell information having an index number equal to the track number.

10. The method set forth in claim 5, wherein the audio tracks belong to an original program chain.

11. The method set forth in claim 5, wherein the audio tracks belong to a user-defined program chain created from user's editing operation.

12. The method set forth in claim 5, wherein the command requesting the representative audio reproduction operation is a 'representative audio ON' signal originated from a user interfacing unit.

13. The method set forth in claim 5, wherein said step (c) is terminated when a 'representative audio OFF' signal is received from a user interfacing unit.

14. The method set forth in claim 13, wherein said step (c) conducts a normal reproduction from starting point of an audio track whose representative audio section is terminated due to the received OFF signal.

15. The method set forth in claim 5, wherein said step (c) reproduces the current representative audio section again from its starting point, if a replay command is entered while conducting the sequential representative audio reproduction operation.

16. The method set forth in claim 5, further comprising:
before the step (a), generating the command requesting the representative audio reproduction operation in response to a selection of a play list and to a turning-on of a representative audio switch.

17. A method for managing representative audio data for a recording medium, the method comprising:
storing audio data type information into a first field of cell information associated with an audio track of the recording medium, the audio data type information indicating whether or not second and third fields in the cell information contain information pertaining to a representative audio section associated with the audio track, the representative audio section identifying a representative audio characteristic of the audio track; and storing representative audio access information associated with the representative audio section, into the second and third fields of the cell information, the representative audio access information being usable in a representative audio reproduction operation to access the representative audio section, wherein the representative audio access information includes start information stored in the second field of the cell information, and duration information stored in the third field of the cell information, the start information identifying a start position of the representative audio section on the recording medium, the duration information identifying a duration of the representative audio section.

18. The method of claim 17, wherein the start information is represented in presentation time (PTM).

19. The method of claim 17, wherein at least a portion of the representative audio access information is represented in presentation time (PTM).

20. The method of claim 17, further comprising:
performing the representative audio reproduction operation based on the type information and the representative audio access information.

21. A data recording medium structure for a data recording medium, comprising:
a plurality of program chains, one of the program chains including at least one cell information having, audio data type information stored in a first field of the cell information, the audio data type information indicating whether or not second and third fields in the cell information contain information pertaining to a representative audio section associated with the audio track, the representative audio section identifying a representative audio characteristic of the audio track; and representative audio location information stored in the second and third fields of the cell information and being associated with the representative audio section, the representative audio location information including start information stored in the second field and duration information stored in the third field, the start information identifying a start position of the representative audio section, the duration information identifying a duration of the representative audio section.

22. The medium structure of claim 21, wherein the start information is represented in presentation time (PTM).

23. The medium structure of claim 21, wherein at least a portion of the representative audio location information is represented in presentation time (PTM).

24. A device for managing representative audio data for a recording medium, the device comprising:
an optical pickup to record information onto the recording medium; and a controller to control the optical pickup to store type information into a first field of cell information associated with an audio track of the recording medium, the type information indicating whether or not second and third fields in the cell information contain information pertaining to a representative audio section associated with the audio track, the representative audio section identifying a representative audio characteristic of the audio track, the controller also controlling the optical pickup to store representative audio location information associated with the representative audio section, into the second and third fields of the cell information, the representative audio location information including start information stored in the second field and duration information stored in the third field, the start information identifying a start position of the representative audio section on the recording medium, the duration information identifying a duration of the representative audio section.

25. The device of claim 24, wherein the controller controls the optical pickup to perform a representative audio reproduction operation based on the type information and the representative audio location information.

26. The device of claim 24, wherein the start information is represented in presentation time (PTM).

27. The device of claim 24, wherein at least a portion of the representative audio location information is represented in presentation time (PTM).

* * * * *